(12) United States Patent
Jeong

(10) Patent No.: US 7,042,673 B2
(45) Date of Patent: May 9, 2006

(54) HARD DISK DRIVE CALIBRATION METHOD AND APPARATUS

(75) Inventor: Jun Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/008,571

(22) Filed: Dec. 10, 2004

(65) Prior Publication Data

US 2005/0168862 A1 Aug. 4, 2005

(30) Foreign Application Priority Data

Dec. 12, 2003 (KR) .................. 10-2003-0090560

(51) Int. Cl.
*G11B 21/02* (2006.01)
(52) U.S. Cl. ..................................... 360/75
(58) Field of Classification Search .............. 360/75, 360/78.06, 78.09; 318/254
See application file for complete search history.

(56) References Cited

U.S. PATENT DOCUMENTS

| 5,917,672 | A  | * | 6/1999  | Pham et al.    | 360/78.09 |
| 5,956,201 | A  | * | 9/1999  | Pham et al.    | 360/78.09 |
| 6,229,663 | B1 |   | 5/2001  | Yoneda et al.  | 360/75    |
| 6,344,942 | B1 | * | 2/2002  | Yarmchuk       | 360/75    |
| 6,463,211 | B1 | * | 10/2002 | Peritore et al.| 318/254   |
| 6,721,119 | B1 | * | 4/2004  | Hassan et al.  | 360/75    |
| 6,754,035 | B1 | * | 6/2004  | Francis et al. | 360/78.06 |

2003/0084571 A1 5/2003 D'Arrigo ............... 29/890.124

FOREIGN PATENT DOCUMENTS

| JP | 08-063920    | 3/1996 |
| JP | 2002-32970   | 1/2002 |
| KR | 1020030038292 | 5/2003 |

* cited by examiner

*Primary Examiner*—David Hudspeth
*Assistant Examiner*—Fred F. Tzeng
(74) *Attorney, Agent, or Firm*—Staas & Halsey LLP

(57) ABSTRACT

A method of calibrating parameters of an apparatus for measuring a back electromotive force (BEMF) of a voice coil motor (VCM) for moving a head on a disk, the apparatus including the VCM having a coil resistance Rm, a coil inductance Lm, and a sensing resistance Rs, including: controlling the VCM to sequentially perform a track following operation of the head on a first track, a transferring operation of the head from the first track to a second track, and a track following operation of the head on the second track; sampling a differential voltage Vadc between a voltage across the VCM and a voltage across the sensing resistance Rs and a VCM driving current Im during the transferring operation; calculating a slope S based on a ratio of a first integration value to a second integration value, where the first integration value is obtained by integrating a product of the sampled differential voltage Vadc and the VCM driving current Im during the transferring operation, the second integration value being obtained by integrating a square of the VCM driving current Im during the transferring operation, the slope S being defined by the equation $S = Rm - Gb \times Rs$, Gb being a gain of an amplifier for amplifying the voltage across the sensing resistance Rs; and calibrating the parameters of the apparatus using the slope S.

26 Claims, 3 Drawing Sheets

HARD DISK DRIVE CALIBRATION METHOD AND APPARATUS

CROSS-REFERENCE TO RELATED APPLICATION

This application claims the priority of Korean Patent Application No. 2003-90560, filed on Dec. 12, 2003, in the Korean Intellectual Property Office, the disclosure of which is incorporated herein by reference.

BACKGROUND OF THE INVENTION

1. Field of the Invention

The present invention relates to a hard disk drive calibration method and apparatus, and more particularly, to a method of calibrating parameters used to measure a back electromotive force (BEMF) of a voice coil motor (VCM), a method for measuring a BEMF of a voice coil motor, and an apparatus therefore.

2. Description of Related Art

In order to accurately control a seek operation of a hard disk drive, it is necessary to detect a velocity of a head. The velocity of the head is calculated by using servo information recorded on a surface of a disk of the hard disk drive. More particularly, the velocity of the head is calculated by using track numbers and sector numbers included in the servo information.

The method is applicable only if the head is able to read the servo information. For example, in a ramp loading/unloading type hard disk drive, the head is not located on the disk before the head is loaded on the disk or after the head is unloaded from the disk since the servo information recorded on the disk cannot be read, it is impossible to calculate the velocity of the head.

For this reason, the ramp loading/unloading type hard disk drive measures the velocity of the head by a back electromotive force (BEMF) of a voice coil motor (VCM) which drives a head slider. That method is based on the fact that the BEMF is proportional to a rotational velocity of the VCM, i.e., the velocity of the head.

Recently, even in hard disk drives that do not use the ramp loading/unloading method, the velocity of the head is measured by the BEMF of the VCM. In such a hard disk drive, the measured velocity of the head is fed back to control the velocity of the head during an unlatch operation. In addition, even in a seek servo operation, the velocity of the head is measured by using the BEMF of the VCM, so that the velocity of the head can be controlled in acceleration or deceleration regions.

FIGS. 1A and 1B are views schematically showing operations of loading/unloading a head slider in accordance with a ramp loading method, respectively. A hard disk drive using the ramp loading method comprises a ramp 6 and a protrusion member 3b provided at the end of an actuator 3. As a VCM driving current is applied to a VCM 5, the actuator 3 rotates around a driving shaft 3a, so that the protrusion member 3b can slide on surface regions 6a to 6d of the ramp 6.

In FIG. 1A, the counter clockwise and clockwise rotations of a head slider 4 correspond to loading and unloading directions, respectively. After the head slider 4 is unloaded from a disk 1, the actuator 3 ends up in contact with the surface region 6d, which is a head-parking surface of the ramp 6. At this time, a coil support member 3c is in contact with or close to an outer crash stop (OCS) 7.

In a process for loading the head slider 4, the actuator 3 rotates in the loading direction to move the head slider 4 on the disk 1. The protrusion member 3b sequentially slides across the surface regions 6a to 6c of the ramp 6 and reaches the surface region 6d. The surface region 6a is a slanted region, as shown in FIG. 1B.

In a process for unloading the head slider 4, the actuator rotates in the unloading direction to move the head slider 4 to the surface region 6a, that is, the head-parking region. More specifically, the protrusion member 3b sequentially slides across the surface regions 6d to 6b and reaches the surface region 6a. The head connected to the actuator 3 is parked on the surface region 6a, as shown in FIG. 1B.

As shown in FIGS. 1A and 1B, when the head slider 4 enters or leaves the area over the disk 1 by the loading or unloading process, it is necessary to control the velocity of the head slider 4 in order to prevent collision between the head slider 4 and ramp 6 or scratches on the disk 1. For this reason, the velocity of the head slider 4 is detected. In addition, in the unloading process, the actuator 3 may collide with the OCS 7. In order to reduce the impact and associated noise, it is necessary to detect and control the velocity of the head slider 4.

As shown in FIG. 1A, while the head slider 4 is being loaded on the disk or being unloaded from the disk, the head slider 4 does not exist on the disk 1 but exists on the ramp 6.

Therefore, the servo information recorded on the disk 1 cannot be read, and it is impossible to calculate the velocity of the head. For this reason, the velocity of the head is measured by the BEMF of the VCM 5.

FIG. 2 is a block diagram showing a VCM control apparatus. The VCM control apparatus includes: a VCM driving unit 202, a sensing resistor 206 having a sensing resistance Rs, a BEMF detection unit 208, an analog-to-digital converter (ADC) 210, a microcontroller 212, and a digital-to-analog converter (DAC) 214. The VCM driving unit 202 drives the VCM 204. In FIG. 2, the VCM 204 is represented by a coil resistance Rm and a coil inductance Lm of itself in a form of an equivalent circuit. The sensing resistor (Rs) 206 senses a current through the VCM 204. The BEMF detection unit 208 detects the BEMF induced in the VCM 204 by a VCM voltage Vvcm applied to the VCM 204 and a VCM current Im sensed by the sensing resistor (Rs) 206. The ADC 210 converts an analog output of the BEMF detection unit 208 into a digital signal. The microcontroller 212 controls the VCM 204. The DAC 214 converts a digital VCM control signal applied by the microcontroller 212 into an analog VCM control signal and applies the analog VCM control signal to the VCM driving unit 202.

The BEMF detection unit 208 includes: a VCM voltage amplifier 208a for amplifying a VCM voltage applied to the VCM 204; a VCM current amplifier 208b for amplifying a VCM current Im detected by the sensing resistor (Rs) 206; and a differential amplifier 208c for amplifying a difference between outputs of the VCM voltage and current amplifiers 208a and 208b.

The VCM voltage amplifier 208a, the VCM current amplifier 208b, and the differential amplifiers 208c have their own gains Ga, Gb, and Gt, respectively. The gain Ga is substantially 1. The VCM voltage amplifier 208a converts a VCM voltage into an amplified voltage, so called voltage-to-voltage amplifier, while the VCM current amplifier 208b converts a VCM current into an amplified voltage using the sensing resister Rs, so called current-to-voltage amplifier.

Referring to FIG. 2, since the VCM current Im flows through the VCM 204, the VCM voltage Vvcm is represented by the following equation:

$$Vvcm=Lm\times dIm/dt+Rm\times Im+Vbemf.$$

A voltage Vs across the sensing resistor Rs 206 is represented by the following equation:

$$Vs=Rs\times Im.$$

Here, dIm/dt is the time derivative of the VCM current Im. Vbemf is a voltage induced by the BEMF of the VCM and is proportional to a rotational velocity of the VCM, that is, the velocity of the head. Since a BEMF constant of the VCM is a known value, it is possible to calculate the rotational velocity of the VCM, that is, the velocity of the head by using the BEMF voltage Vbemf and the BEMF constant.

The VCM voltage Vvcm is amplified by the VCM voltage amplifier 208a with its gain Ga of 1. The voltage Vs across the sensing resistor 206 is amplified by the VCM current amplifier 208b with its gain Gb. The difference between the outputs of the amplifiers 208a and 208b is amplified by the differential amplifier 208c with its gain Gt. The output of the differential amplifier 208c is applied to the ADC 210. The voltage Vadc measured by the ADC 210 is a differential voltage, that is, a difference between one voltage across the coil resistor Rm and the coil inductance Lm and the other voltage across the sensing resistor Rs 206, represented as follows:

$$Vadc = Gt \times (Vvcm - Gb \times Vs)$$
$$= Gt \times (Lm \times d\,Im/dt + Rm \times Im + Vbemf - Gb\ x[^*]\ Rs \times Im).$$

Since the amplifiers 208a to 208c have their own offsets, the voltage Vadc measured by the ADC 210 also has its own offset voltage Voffs.

In the VCM control unit shown in FIG. 2, the gain Gb of the VCM current amplifier 208b can be adjusted by the microcontroller 212.

Assuming that the VCM current Im applied by the VCM driving unit 202 is constant, the voltage Vadc measured by the ADC 210 is obtained by applying the offset voltage Voffs. The voltage Vadc is represented by Equation 1:

$$Vadc=Gt\times\{(Rm-Gb\times Rs)\times Im+Vbemf\}+Voffs. \quad [\text{Equation 1}]$$

If the gain Gb of the VCM current amplifier 208b can be set by using the ratio Rm/Rs of the coil resistance Rm to the sensing resistance Rs, the voltage Vadc measured by the ADC 210 is given by:

$$Vadc=Gt\times\{(Rm-Rm/Rs\times Rs)\times Im+Vbemf\}+Voffs=Gt\times Vbemf+Voffs$$

Therefore, if the coil resistance Rm and the offset voltage Voffs are known, the BEMF voltage Vbemf proportional to the velocity of the head, that is, the velocity of the VCM 204, can be calculated.

In the conventional art, the ratio Rm/Rs and the offset voltage Voffs are calibrated by using the crash stop just before the head is loaded on the ramp.

For example, if a current of 0 mA is applied to the VCM 204 and a head slider is being parked on the ramp 6, the voltage Vadc measured by the ADC 210 is equal to the offset voltage Voffs. In the hard disk drive comprising the ramp loading/unloading type latch system, the protrusion member 3b or a latch device using a magnetic force is disposed at the location corresponding to the parking position of the head. When the current of 0 mA is applied to the VCM 204, the VCM 204 does not move. As a result, the BEMF voltage Vbemf is 0 V, so that it is possible to measure the offset voltage Voffs.

Next, the VCM 204 is driven, so that a force can be exerted towards the OCS. With respect to various values of the gains Gb, it is determined which value of the gain Gb corresponds to the voltage Vadc measured by the ADC 210 closest to the offset voltage Voffs. Since the VCM 204 stops due to the OCS, the BEMF voltage Vbemf is 0 V. The voltage Vadc measured by the ADC 210 is given by:

$$Vadc=Gt\times(Gm-Gb\times Rs)\times Im+Voffs.$$

Here, as the gain Gb of the VCM current amplifier 208b converges to the ratio Rm/Rs, the voltage Vadc measured by the ADC 210 approaches the offset voltage Voffs.

In order to accurately measure the BEMF voltage Vbemf by using the apparatus shown in FIG. 1, the offset voltage Voffs and the gain Gb of the VCM current amplifier 208b have to be calibrated.

The gain Gb of the VCM current amplifier 208b is a binary value adjusted by a microcontroller 212. Therefore, even though a DAC converter (not shown) of the microcontroller 212 to output the gain Gb of VCM current amplifier 208b has a high resolution, there is essentially a quantization error in the gain Gb. As a result, even if the gain Gb of the VCM current amplifier 208b is well adjusted, a value of Rm−Gb×Rs may not be 0 due to the quantization error.

Hereinafter, the value of Rm−Gb×Rs is referred to as a "slope S." The voltage Vadc measured by the ADC 210 is represented by Equation 2.

$$Vadc=Gt\times(S\times Im+Vbemf)+Voffs \quad [\text{Equation 2}]$$

The slope S can be corrected by using the crash stop. If the gain Gt of the differential amplifier 208c is known and the offset voltage Voffs and the gain Gb of the VCM current amplifier 208b are calibrated, the VCM 204 is driven toward the crash stop. At the same time, two different levels of current are made to flow through the VCM coil. The slope S can be corrected by using the voltage Vadc measured by the ADC 210 in the two cases.

As described above, in order to measure the BEMF of the VCM, it is necessary to calibrate the offset voltage Voffs, the gain Gb of the VCM current amplifier, and the slope S induced from the finite resolution of the gain Gb. Here, the word "finite resolution" means that its precision is limited by a number of bits to represent certain value.

Before the head is loaded, the offset voltage Voffs, the gain Gb of the VCM current amplifier 208b, and the slope S can be calibrated by using the crash stop described above.

The ratio Rm/Rs of the coil resistance Rm of the VCM 204 to the sensing resistance Rs used to set the gain Gb of the VCM current amplifier 208b is sensitive to a temperature of the VCM coil. In particular, the coil resistance Rm of the VCM 204 is changed dramatically according to the temperature.

Although the offset voltage Voffs, the gain Gb of the VCM current amplifier 208b, and the slope S are set before the head is loaded, the temperature of the VCM coil may change due to various causes. As a result, since the coil resistance Rm of the VCM 204 changes, it is necessary to reset the gain Gb of the VCM current amplifier 208b and the slope S.

In this case, if the change in the temperature of the VCM coil is obtained, the gain Gb of the VCM current amplifier 208b and the slope S can be reset. However, an additional temperature sensor is needed, which is disadvantageous. In addition, it is very difficult to measure the temperature of only the VCM coil.

Many types of hard disk drives include temperature sensors for measuring their own operating temperatures. However, since the temperature of the VCM coil changes with the current through the VCM coil, the gain Gb of the VCM current amplifier 208b and the slope S reset based on the operational temperature of the hard disk drive are very inaccurate.

Meanwhile, there is a method of resetting the gain Gb of the VCM current amplifier 208b and the slope S by using an inner crash stop (ICS) similar to the aforementioned calibration method performed just before the head is loaded. However, in the method, the head slider 4 must impact on the ICS, which may lead to an undesirable result. In addition, after the head moves to an inner diameter area of the disk 1 to reset the gain Gb of the VCM current amplifier 208b and the slope S, the head is unloaded. Therefore, it takes a long time to perform the unloading operation.

In order to solve the problems of the conventional art, a method of correcting the slope S before the head is unloaded and a method of resetting only the gain Gb of the VCM current amplifier 208b before the head is unloaded have been proposed. The method of correcting the slope S is disclosed in U.S. Pat. No. 6,229,663. In the method of resetting only the gain Gb of the VCM current amplifier 208b without taking the slope S into consideration, while a seek operation is performed to move the head between two positions of the disk, the voltages Vadc are measured with the ADC 210. Next, the gain Gb of the VCM current amplifier 208b is obtained so that the average of the voltages Vadc can be equal to the offset voltage Voffs.

In the conventional calibration method, since repetitive seek operations are performed to correct the gain Gb of the VCM current amplifier 208b and the slope S before the head is unloaded, it takes long time to perform the calibration. In particular, in the method of measuring the gain Gb of the VCM current amplifier 208b without taking the slope S into consideration, the measured BEMF voltage Vbemf may be very inaccurate.

If the gain Gb of the VCM current amplifier 208b and the slope S are not accurately corrected, the measured BEMF voltage Vbemf of VCM 204 is so inaccurate that the unloading operation cannot be controlled properly.

BRIEF SUMMARY

Embodiments of the present invention provide a simple, accurate calibration method.

Embodiments of the present invention also provide a method of measuring a BEMF (back electromotive force) of a VCM (voice coil motor) using the calibration method.

Embodiments of the present invention also provide an apparatus using the method of measuring the BEMF.

According to an aspect of the present invention, there is provided a method of calibrating parameters of an apparatus for measuring a back electromotive force (BEMF) of a voice coil motor (VCM) for moving a head on a disk, the apparatus including the VCM having a coil resistance Rm, a coil inductance Lm, and a sensing resistance Rs, which are temperature dependant. The method includes: controlling the VCM to sequentially perform a track following operation of the head on a first track, a transferring operation of the head from the first track to a second track, and a track following operation of the head on the second track; sampling a differential voltage Vadc between a voltage across the VCM and a voltage across the sensing resistance Rs and a VCM driving current Im during the transferring operation; calculating a slope S based on a ratio of a first integration value to a second integration value, where the first integration value is obtained by integrating a product of the sampled differential voltage Vadc and the VCM driving current Im during the transferring operation, the second integration value being obtained by integrating a square of the VCM driving current Im during the transferring operation, the slope S being defined by the equation $S=Rm-Gb\times Rs$, Gb being a gain of an amplifier for amplifying the voltage across the sensing resistance Rs; and calibrating the parameters of the apparatus using the slope S.

According to another aspect of the present invention, there is provided a method of measuring a back electromotive force (BEMF) of a voice coil motor (VCM) for moving a head on a disk, the VCM having a coil resistance Rm, a coil inductance Lm, and a sensing resistance Rs, which are temperature dependant. The method includes: calculating a ratio of the coil resistance Rm to the sensing resistance Rs when the head does not move when the VCM driving current Im is applied to the VCM; controlling the VCM to sequentially perform a track following operation of the head on a first track, a transferring operation of the head from the first track to a second track, and a track following operation of the head on the second track; sampling a differential voltage (Vadc) between a voltage across the VCM and a voltage across the sensing resistance Rs and a VCM driving current (Im) during the transferring operation; calculating, when an amplifier for amplifying the differential voltage Vadc has an offset voltage Voffs and a gain Gt, a slope S based on a ratio of a third integration value to a product of a second integration value and the gain Gt, wherein the third integration value is obtained by integrating a product of the sampled difference voltage Vadc minus an offset voltage Voffs and the VCM driving current Im during the transferring operation, the second integration value being obtained by integrating a square of the VCM driving current Im during the transferring operation, the slope S being defined by the equation $S=Rm-Gb\times Rs$; calibrating parameters of an apparatus for measuring the BEMF of the VCM using the slope S; and measuring the BEMF of the VCM based on the calibrated parameters.

According to another aspect of the present invention, there is provided an apparatus for measuring a back electromotive force (BEMF) of a voice coil motor (VCM) for moving a head on a disk, the apparatus including the VCM having a coil resistance Rm, a coil inductance Lm, and a sensing resistance Rs, which are temperature dependant. The apparatus including: a differential amplifier which obtains a differential voltage Vadc between a voltage across the VCM and a voltage across the sensing resistance Rs and a VCM driving current Im; a VCM driving unit which applies a VCM driving current Im to the VCM; and a control unit which controls the VCM with the VCM driving unit. The control unit calibrates parameters for measuring the BEMF of the VCM by: controlling the VCM to sequentially perform a track following operation of the head on a first track, a transferring operation of the head from the first track to a second track, and a track following operation of the head on the second track; sampling the differential voltage Vadc and a VCM driving current Im during the transferring operation; calculating a slope S based on a ratio of a first integration value to a product of a second integration value and the gain Gt, the first integration value being obtained by integrating a product of the sampled differential voltage Vadc and the VCM driving current Im during the transferring operation, the second integration value being obtained by integrating a square of the VCM driving current Im during the transferring operation, the slope S being defined by the equation S=Rm−Gb×Rs, Gb being a gain of an amplifier for amplifying the voltage across the sensing resistance Rs; and calibrating parameters of the apparatus for measuring the BEMF of the VCM using the slope S.

According to another aspect of the present invention, there is provided a method of calibrating a voice coil motor (VCM), including: moving a head of a hard disk drive to follow a first track on a disk and setting the velocity of the head to 0; crossing the head over from the first track to a second track on the disk and sampling, while the head is crossing over, a differential voltage Vadc and a VCM driving current Im applied to the VCM; moving the head to follow the second track and setting the velocity of the head to 0; calculating $\Sigma\{(\text{Vadc}-\text{Voffs})\times\text{Im}\}$ and $\Sigma\text{Im}^2$; calculating a slope S using the following equation: $S=\Sigma\{(\text{Vadc}-\text{Voffs})\times\text{Im}\}/\{Gt\times\Sigma\text{Im}^2\}$; and calibrating the VCM according to the slope S. The VCM includes a coil resistance Rm and a coil inductance Lm. The Vadc is output by a BEFM detector and is defined by the following equation $\text{Vadc}=Gt\times\{(Rm-Gb\times Rs)\times\text{Im}+\text{Vbemf}\}+\text{Voffs}$, Gt is a gain of a differential amplifier which amplifies a difference between a VCM voltage amplifier which amplifies a voltage applied to the VCM and a VCM current amplifier which amplifies a voltage across a resistor which senses the VCM current Im, Gb is a gain of the VCM current amplifier, and Vbemf is a voltage induced by the BEMF of the VCM, and Voffs is a voltage offset of the Vadc.

According to another aspect of the present invention, there is provided a voice coil motor (VCM) control apparatus including: a VCM driving unit which drives a VCM; a sensing resistor having a sensing resistance Rs and which senses a current through the VCM; and a back electromotive force (BEMF) detector which detects the BEMF induced in the VCM via a VCM voltage Vvcm applied to the VCM and a VCM current Im sensed by the sensing resistor. The BEMF detector has a VCM voltage amplifier which amplifies the VCM voltage Vvcm, a VCM current amplifier which amplifies the VCM current Im, and a differential amplifier which outputs a differential voltage representing a difference between the amplified VCM voltage Vvcm and the amplified VCM current Im.

According to another embodiment of the present invention, there is provided a method of calibrating a parameter for measuring a back electromotive force (BEMF) of a voice coil motor (VCM) by performing a short-distance seek operation, including: following a first track; seeking a second track and sampling a differential voltage Vadc and a VCM driving current Im applied to the VCM; following the second track; calculating $\Sigma\{(\text{Vadc}-\text{Voffs})\times\text{Im}\}$ and $\Sigma\text{Im}^2$; calculating the slope S using the following equation: $S=\Sigma\{(\text{Vadc}-\text{Voffs})\times\text{Im}\}/\{Gt\times\Sigma\text{Im}^2\}$; and calibrating the VCM according to the slope S.

According to another aspect of the present invention, there is provided a back electromotive force (BEMF) measuring apparatus which measures a BEMF of a voice coil motor (VCM). The apparatus includes: a VCM voltage amplifier which amplifies a VCM voltage Vvcm applied to the VCM; a VCM current amplifier which amplifies a VCM current Im sensed by a sensing resistor which senses a current through the VCM; and a differential amplifier which outputs a differential voltage representing a difference between the amplified VCM voltage Vvcm and the amplified VCM current Im.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
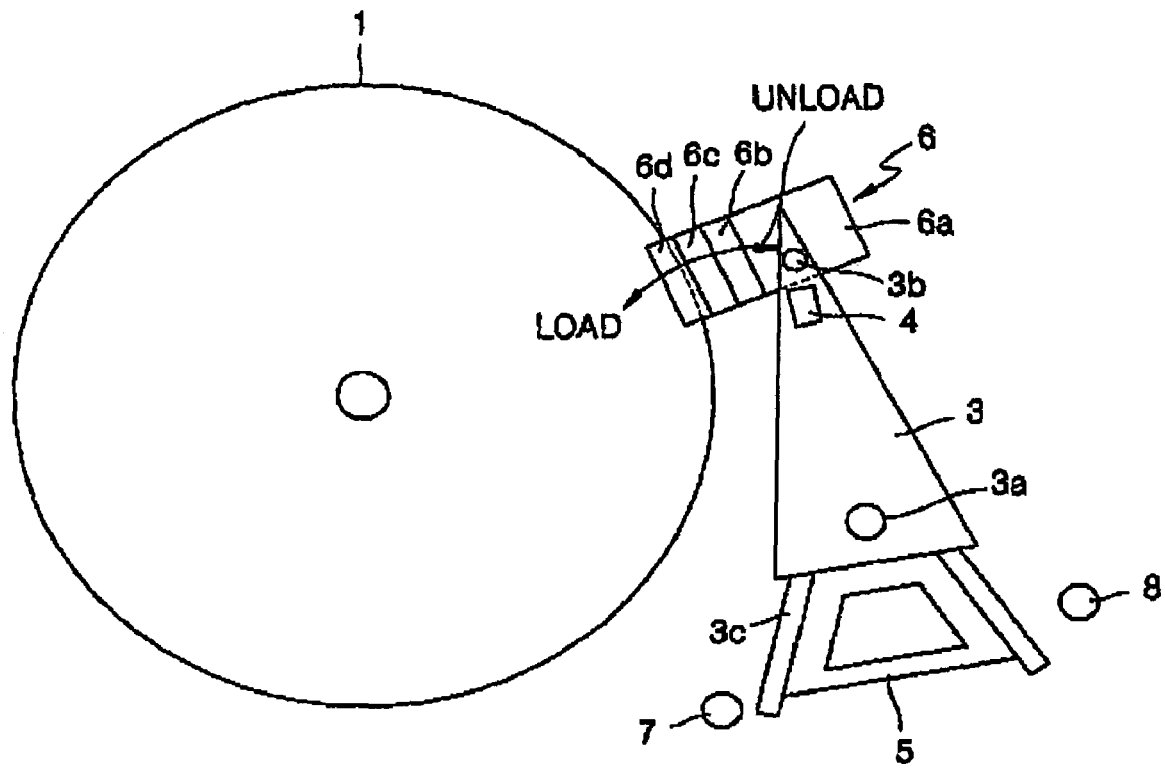
FIGS. 1A and 1B are views schematically showing operations of loading/unloading a head slider in accordance with a conventional ramp loading method.
Figure 1B:
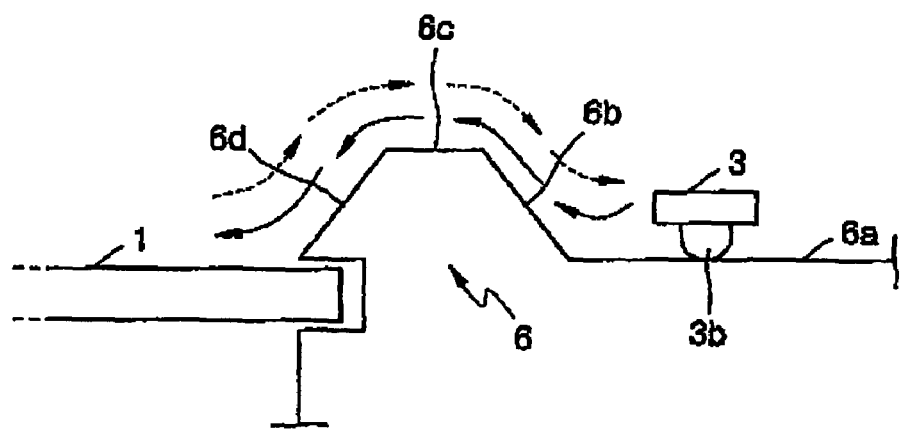
Figure 2:
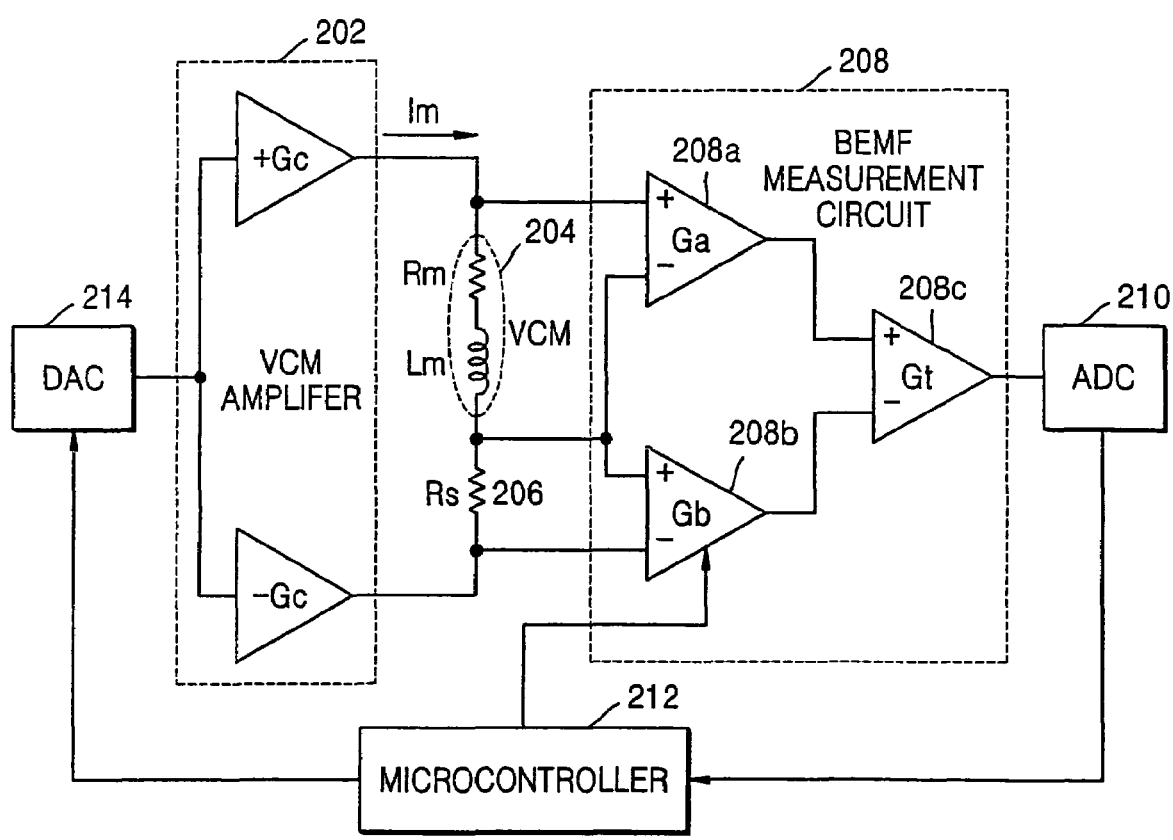
FIG. 2 is a block diagram showing a conventional voice coil motor (VCM) control apparatus.

Reference will now be made in detail to embodiments of the present invention, examples of which are illustrated in the accompanying drawings, wherein like reference numerals refer to the like elements throughout. The embodiments are described below in order to explain the present invention by referring to the figures.

In an embodiment of the present invention, a slope S can be corrected by performing a single seek servo operation. In a conventional method, the slope S is corrected by repeatedly performing a plurality of seek servo operations. In comparison to the conventional method, the calibration method according to an embodiment of the present invention can accurately correct the slope S by performing the seek servo operation only once. In addition, according to an embodiment of the present invention, the calibration of the slope S can be obtained by performing even a short-distance seek operation because the seek distance is not related to the calibration of the slope S.

Even if a gain Gb of a voice coil motor (VCM) current amplifier, an offset voltage Voffs, and the slope S are corrected before a head is loaded, in the present invention, the gain Gb and the slope S are corrected again before the head is unloaded in order to accurately measure a back electromotive force (BEMF) of the VCM.

With a VCM driving current Im multiplied to both sides of the Equation (2), and the summation of it during a seek operation achieved, the result is as follows, $$\Sigma\{(\text{Vadc}-\text{Voffs})\times\text{Im}\}=Gt\times S\times\Sigma\text{Im}^2+Gt\times\Sigma(\text{Vbemf}\times\text{Im}) \quad \text{[Equation 3]}$$

When the gain Gb is fixed, the slope S is dependent on a coil resistance Rm and a sensing resistance Rs of the VCM. In particular, the slope S is greatly dependent on the temperature of the VCM coil after the head is loaded.

Since a BEMF voltage Vbemf is proportional to a velocity v of the head, the following relation is obtained:

$$\text{Vbemf}=kv\times v$$

Here, kv denotes a velocity coefficient.

Sine the VCM driving current Im is proportional to an acceleration of the head, when a bias force exerted on the VCM is about 0, the following equation is obtained:

$$\text{Im}=ka\times a$$

Here, ka denotes an acceleration coefficient.

Accordingly, if a track following operation that follows a track, a transferring operation that seeks to another track, and a track following operation that follows the another track are sequentially performed, the value of $\Sigma(\text{Vbemf} \times \text{Im})$ measured during the seek servo operation becomes $k \times \Sigma(v \times a)$. The value of $k \times \Sigma(v \times a)$ is finally equal to the integral of $k/2 \times \{v(tf)^2 - v(t0)^2\}$. Here, k is a product of the velocity coefficient kv and the acceleration coefficient ka.

Here, tf is a time when the seek servo operation ends, and t0 is a time when the seek servo operation starts. The value of $\Sigma(\text{Vbemf} \times \text{Im})$ measured during the seek servo operation is independent of the state during the seek servo operation, but it is dependent on states before and after the seek servo operation. When the track following servo operation is starting or ending, the head does not move, i.e., the velocity of the head is near 0. Therefore, Equation 4 is obtained:

$$\Sigma(Vbemf \times Im) = 0 \quad \text{[Equation 4]}$$

Applying Equation 4 to Equation 3 and solving for S yields Equation 5:

$$S = \Sigma\{(Vadc - Voffs) \times Im\}/\{Gt \times \Sigma Im^2\} \quad \text{[Equation 5]}$$

The offset voltage Voffs and the gain Gt of the differential amplifier are known values, and the VCM driving current Im is determined in accordance with a digital analog converter (DAC) and a VCM driving unit. Therefore, it is possible to reset the slope S by using Equation 5.

The "bias force" means a force exerted on the head due to elasticity of flexible cables assembled to the actuator and restriction coefficients of bearings of the rotary shaft. The bias force can be measured by driving the VCM. The bias force is needed for the seek servo and track following servo operation. In most cases, a bias force associated with head positions is measured when a hard disk drive is manufactured.

Substituting the differential voltage Vadc measured by an analog digital converter (ADC) and the reset slope S into Equation 2, the BEMF voltage Vbemf is obtained.

Figure 3:
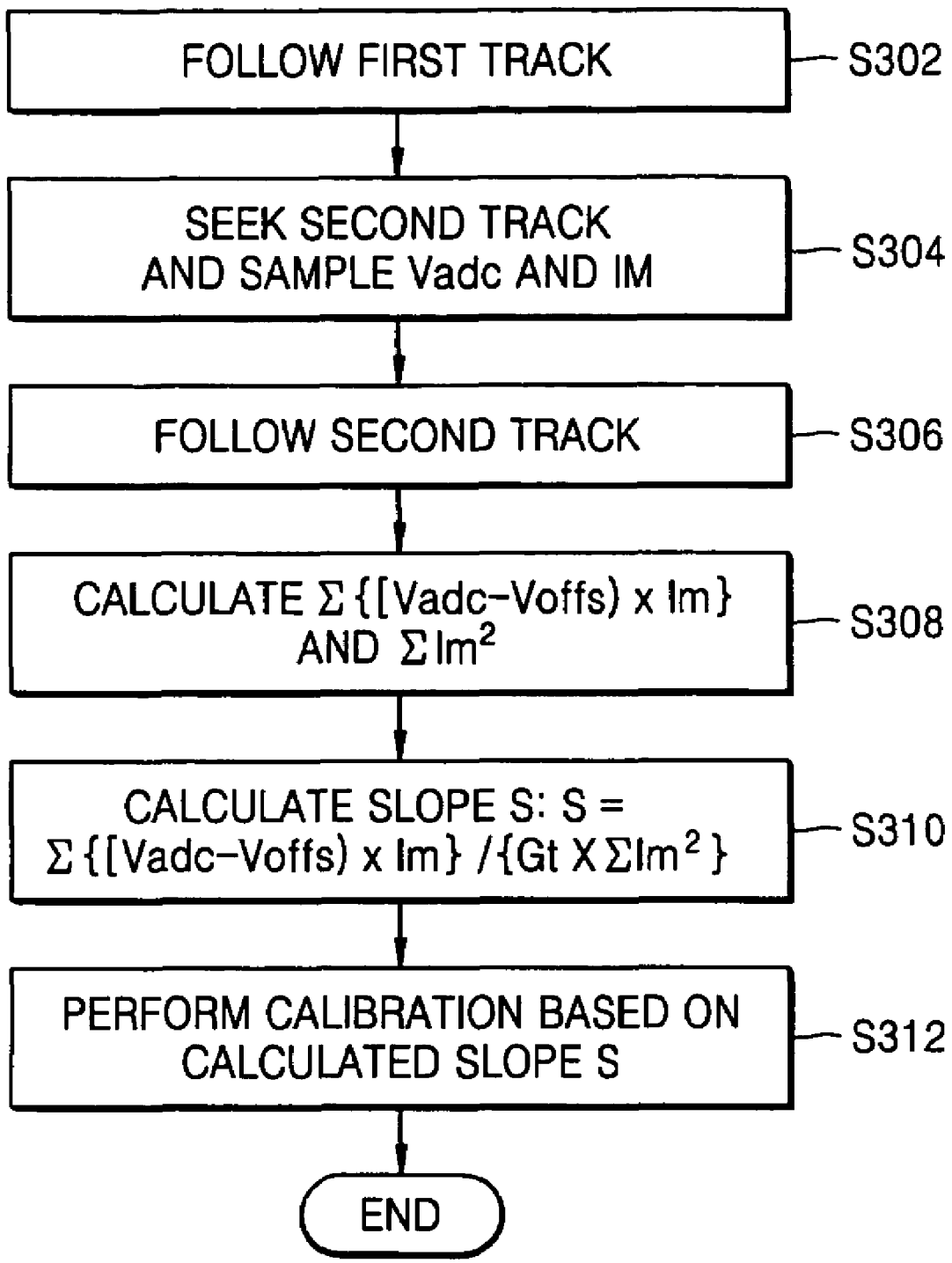
FIG. 3 is a flowchart showing a calibration method according to an embodiment of the present invention.

FIG. 3 is a flowchart showing a calibration method according to an embodiment of the present invention.

Firstly, by a track following operation, the head follows a first track (S302). By a track following control operation, the velocity of the head is controlled to be 0.

Next, by a track seek operation, the head crosses over from the first track to the second track. While the head is crossing over, the differential voltage Vadc and the VCM driving current Im are sampled (S304).

Here, no matter how the distance between the first track and the second track may be long, it does not matter. However, it is preferable that the first and second tracks are disposed at such positions that the bias force can be substantially zero. The position where the bias force is substantially zero can be determined when the hard disk drive is manufactured.

The VCM driving current Im can be determined in accordance with a value applied by the DAC (214). Therefore, in the present embodiment, an additional unit for measuring the VCM driving current Im is not needed.

Next, by the track following mode, the head follows the second track (S306). By a track following control operation, the velocity of the head is controlled to be 0.

Next, $\Sigma\{(Vadc - Voffs) \times Im\}$ and $\Sigma Im^2$ are calculated (S308).

The slope S is obtained by using Equation 5 (S310):

$$S = \Sigma\{(Vadc - Voffs) \times Im\}/\{Gt \times \Sigma Im^2\}$$

The calibration for offset voltage Voffs, amplifying gain Gb of the VCM current amplifier 208b and slope S is performed by using the calculated slope S (S312). Referring to Equation 5, it can be understood that the slope S can be corrected irrespective of the temperature of the VCM coil. Therefore, an additional sensor for measuring the coil resistance Rm is not needed in the calibration method of the present invention.

In addition, according to the disclosed embodiment of the present invention, the slope S, a parameter for calculating the BEMF, can be reset by only a single seek operation, irrespective of a distance associated with the seek operation. Therefore, it is possible to reduce time for calibration.

In addition, according to the disclosed embodiment of the present invention, the slope S is reset in order to compensate for a deviation of the gain Gb. Therefore, a high-resolution apparatus for setting the gain Gb is not needed. In addition, a high-resolution ADC is also not needed. As a result, it is possible to reduce the cost of manufacturing a hard disk drive.

The disclosed embodiment of the present invention may be implemented as a method, in an apparatus, or in a system, etc. When implemented as software, elements of the disclosed embodiment are essentially code segments for performing necessary tasks. The code segments or a program can be stored in a computer-readable medium or transmitted as computer data signals coupled to carrier waves through a communication medium or network. The computer-readable medium includes any medium that can store or transfer information. Examples of the computer-readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

According to a calibration method of the present embodiment, since a slope S, a parameter for measuring a BEMF of a VCM, can be corrected by only a single seek operation before a head is unloaded, it is possible to obtain a simple calibration operation and to reduce a calibration time.

In addition, according to a BEMF measuring apparatus of the present embodiment, it is possible to effectively measure a BEMF of a VCM without a temperature sensor or current measurement instruments.

Although an embodiment of the present invention have been shown and described, it would be appreciated by those skilled in the art that changes may be made in the embodiment without departing from the principles and spirit of the invention, the scope of which is defined in the claims and their equivalents.

What is claimed is:

1. A method of calibrating parameters of an apparatus for measuring a back electromotive force (BEMF) of a voice coil motor (VCM) for moving a head on a disk, the apparatus including the VCM having a coil resistance Rm, a coil inductance Lm, and a sensing resistance Rs, which are temperature dependant, comprising:
   controlling the VCM to sequentially perform a track following operation of the head on a first track, a transferring operation of the head from the first track to a second track, and a track following operation of the head on the second track;

sampling a differential voltage Vadc between a voltage across the VCM and a voltage across the sensing resistance Rs and a VCM driving current Im during the transferring operation;

calculating a slope S based on a ratio of a first integration value to a second integration value, where the first integration value is obtained by integrating a product of the sampled differential voltage Vadc and the VCM driving current Im during the transferring operation, the second integration value being obtained by integrating a square of the VCM driving current Im during the transferring operation, the slope S being defined by the equation S=Rm−Gb×Rs, Gb being a gain of an amplifier for amplifying the voltage across the sensing resistance Rs; and calibrating the parameters of the apparatus using the slope S.

2. The method according to claim 1, wherein the apparatus also includes an amplifier which amplifies the differential voltage Vadc, the amplifier having a offset voltage Voffs and a gain Gt, wherein the calculating the slope S is based on a ratio of a third integration value to a product of the second integration value and the gain Gt, and wherein the third integration value is obtained by integrating a product of the sampled difference voltage Vadc minus an offset voltage Voffs and the VCM driving current Im during the transferring operation.

3. The method according to claim 1, wherein the first and second tracks are located on a region on the disk where a bias force of the VCM is a minimum.

4. A method of measuring a back electromotive force (BEMF) of a voice coil motor (VCM) for moving a head on a disk, the VCM having a coil resistance Rm, a coil inductance Lm, and a sensing resistance Rs, which are temperature dependant, comprising:

calculating a ratio of the coil resistance Rm to the sensing resistance Rs when the head does not move when the VCM driving current Im is applied to the VCM;

controlling the VCM to sequentially perform a track following operation of the head on a first track, a transferring operation of the head from the first track to a second track, and a track following operation of the head on the second track;

sampling a differential voltage (Vadc) between a voltage across the VCM and a voltage across the sensing resistance Rs and a VCM driving current (Im) during the transferring operation;

calculating, when an amplifier for amplifying the differential voltage Vadc has an offset voltage Voffs and a gain Gt, a slope S based on a ratio of a third integration value to a product of a second integration value and the gain Gt, wherein the third integration value is obtained by integrating a product of the sampled difference voltage Vadc minus an offset voltage Voffs and the VCM driving current Im during the transferring operation, the second integration value being obtained by integrating a square of the VCM driving current Im during the transferring operation, the slope S being defined by the equation S=Rm−Gb×Rs, Gb being a gain of an amplifier for amplifying the voltage across the sensing resistance Rs;

calibrating parameters of an apparatus for measuring the BEMF of the VCM using the slope S; and measuring the BEMF of the VCM based on the calibrated parameters.

5. The method according to claim 4, wherein the calibrated parameters are the slope S or the gain Gb.

6. The method according to claim 4, wherein the first and second tracks are located on a region of the disk where a bias force of the VCM is a minimum.

7. The method according to claim 4, wherein the state in which the head does not move when the VCM driving current Im is applied to the VCM is a state in which an inner crash stop or outer crash stop holds the head.

8. The method according to claim 4, wherein the state in which the head does not move when the VCM driving current Im is applied to the VCM is a state in which a velocity of the VCM is 0.

9. An apparatus for measuring a back electromotive force (BEMF) of a voice coil motor (VCM) for moving a head on a disk, the apparatus including the VCM having a coil resistance Rm, a coil inductance Lm, and a sensing resistance Rs, which are temperature dependant, comprising:

a differential amplifier which obtains a differential voltage Vadc between a voltage across the VCM and a voltage across the sensing resistance Rs and a VCM driving current Im;

a VCM driving unit which applies a VCM driving current Im to the VCM; and a control unit which controls the VCM with the VCM driving unit, wherein the control unit calibrates parameters for measuring the BEMF of the VCM by:

controlling the VCM to sequentially perform a track following operation of the head on a first track, a transferring operation of the head from the first track to a second track, and a track following operation of the head on the second track;

sampling the differential voltage Vadc between a voltage across the VCM and a voltage across the sensing resistance Rs and a VCM driving current Im during the transferring operation;

calculating a slope S based on a ratio of a first integration value to a product of a second integration value and the gain Gt, the first integration value being obtained by integrating a product of the sampled differential voltage Vadc and the VCM driving current Im during the transferring operation, the second integration value being obtained by integrating a square of the VCM driving current Im during the transferring operation, the slope S being defined by the equation S=Rm−Gb×Rs, Gb being a gain of an amplifier for amplifying the voltage across the sensing resistance Rs; and calibrating parameters of the apparatus for measuring the BEMF of the VCM using the slope S.

10. The apparatus according to claim 9, wherein the first and second tracks are located on a region of the disk where a bias force of the VCM is a minimum.

11. The apparatus according to claim 9, further comprising an amplifier which amplifies the differential voltage Vadc, the amplifier having a offset voltage Voffs and a gain Gt, wherein, the slope S is calculated based on a ratio of a third integration value to a product of the second integration value and the gain Gt, the third integration value being obtained by integrating a product of the sampled difference voltage Vadc minus an offset voltage Voffs and the VCM driving current Im during the transferring operation.

12. The apparatus according to claim 9, wherein the control unit performs processes for:
   calculating a ratio of the coil resistance Rm to the sensing resistance Rs in a state in which the head does not move when the VCM driving current Im is applied to the VCM;
   calibrating the slope S or the gain Gb based on the calculated ratio; and
   measuring the BEMF of the VCM based on the calibrated slope S or gain Gb.

13. The apparatus according to claim 12, wherein the state in which the head does not move when the VCM driving current Im is applied to the VCM is a state in which an inner crash stop or outer crash stop holds the head.

14. The apparatus according to claim 12, wherein the state in which the head does not move even when the VCM driving current Im is applied to the VCM is a state in which a velocity of the VCM is of 0.

15. The apparatus according to claim 9, wherein the control unit selects the first and second tracks out of tracks located on a region of the disk where a bias force of the VCM is a minimum.

16. A method of calibrating a voice coil motor (VCM), comprising:
   moving a head of a hard disk drive to follow a first track on a disk and setting the velocity of the head to 0;
   crossing the head over from the first track to a second track of the disk and sampling, while the head is crossing over, a differential voltage Vadc and a VCM driving current Im applied to the VCM;
   moving the head to follow the second track and setting the velocity of the head to 0;
   calculating $\Sigma\{(Vadc-Voffs)\times Im\}$ and $\Sigma Im^2$;
   calculating a slope S using the following equation: $S=\Sigma\{(Vadc-Voffs)\times Im\}/\{Gt\times\Sigma Im^2\}$; and
   calibrating the VCM according to the slope S,
   wherein the VCM includes a coil resistance Rm and a coil inductance Lm, and
   wherein the Vadc is output by a BEFM detector and is defined by the following equation $Vadc=Gt\times\{(Rm-Gb\times Rs)\times Im+Vbemf\}+Voffs$, Gt is a gain of a differential amplifier which amplifies a difference between a VCM voltage amplifier which amplifies a voltage applied to the VCM and a VCM current amplifier which amplifies a voltage across a resistor which senses the VCM current Im, Gb is a gain of the VCM current amplifier, and Vbemf is a voltage induced by the BEMF of the VCM, and Voffs is a voltage offset of the Vadc.

17. The calibration method of claim 16, wherein the method is performed in a single seek servo operation.

18. A voice coil motor (VCM) control apparatus comprising:
   a VCM driving unit which drives a VCM;
   a controller which controls the VCM;
   a sensing resistor having a sensing resistance Rs and which senses a current through the VCM; and
   a back electromotive force (BEMF) detector which detects the BEMF induced in the VCM via a VCM voltage Vvcm applied to the VCM and a VCM current Im sensed by the sensing resistor, the BEMF detector having a VCM voltage amplifier which amplifies the VCM voltage Vvcm, a VCM current amplifier which amplifies the VCM current Im, and a differential amplifier which outputs a differential voltage representing a difference between the amplified VCM voltage Vvcm and the amplified VCM current Im,
   wherein the controller calibrates parameters for measuring the BEMF of the VCM by:
      controlling the VCM to sequentially perform a track following operation of the head on a first track, a transferring operation of the head from the first track to a second track, and a track following operation of the head on the second track;
      sampling the differential voltage during the transferring operation;
      calculating a slope S based on a ratio of a first integration value to a product of a second integration value and the gain Gt, the first integration value being obtained by integrating a product of the sampled differential voltage Vadc and the VCM driving current Im during the transferring operation, the second integration value being obtained by integrating a square of the VCM current Im during the transferring operation, the slope S being defined by the equation $S=Rm-Gb\times Rs$, Gb being a gain of an amplifier for amplifying the voltage across the sensing resistor Rs; and
      calibrating parameters of the BEMF of the VCM using the slope S.

19. The VCM control apparatus of claim 18, wherein the VCM voltage Vvcm is defined by the following equation:

$$Vvcm=Lm\times dIm/dt+Rm\times Im+Vbemf,$$

wherein dIm/dt is the time derivative of the VCM current Im and Vbemf is a voltage induced by the BEMF of the VCM.

20. The VCM control apparatus of claim 18, wherein the voltage across the sensing resistor is defined by the following equation:

$$Vs=Rs\times Im.$$

21. The VCM control apparatus of claim 18, wherein the VCM includes a coil resistance Rm and a coil inductance Lm, Wherein the VCM voltage amplifier, the VCM current amplifier, and the differential amplifier have respective gains of Ga, Gb, Gc, and wherein the BEMF detection unit outputs a voltage Vadc which is defined by the following equation:

$$Vadc=Gt\times(Vvcm-Gb\times Vs)=Gt\times(Lm\times dIm/dt+Rm\times Im+Vbemf-Gb*Rs\times Im),$$

and wherein dIm/dt is the time derivative of the VCM current Im and Vbemf is a voltage induced by the BEMF of the VCM and is proportional to a rotational velocity of the VCM.

22. The VCM control apparatus of claim 18, wherein the gain of the VCM current amplifier is adjusted by the controller.

23. The VCM control apparatus of claim 18, further comprising a digital-to-analog converter (DAC) which converts a digital VCM control signal applied by a microcontroller into an analog VCM control signal and applies the analog VCM control signal to the VCM driving unit.

24. The VCM of claim 18, further comprising an analog-to-digital converter (ADC) which converts an analog output of the BEMF detection unit into a digital signal.

25. The VCM control apparatus of claim 18, the VCM voltage amplifier has a gain of about 1.

26. A method of calibrating a parameter S for measuring a back electromotive force (BEMF) of a voice coil motor (VCM) by performing a short-distance seek operation, comprising:

following a first track;

seeking a second track and sampling a differential voltage Vadc and a VCM driving current Im applied to the VCM;

following the second track;

calculating $\Sigma\{(Vadc-Voffs) \times Im\}$ and $\Sigma Im^2$, Voffs being a voltage offset;

calculating the slope S using the following equation: $S=\Sigma\{(Vadc-Voffs) \times Im\}/\{Gt \times \Sigma Im^2\}$, Gt being a gain of differential amplifier; and calibrating the VCM according to the slope S.

* * * * *

UNITED STATES PATENT AND TRADEMARK OFFICE
CERTIFICATE OF CORRECTION

PATENT NO. : 7,042,673 B2  
APPLICATION NO. : 11/008571  
DATED : May 9, 2006  
INVENTOR(S) : Jun Jeong Page 1 of 1

It is certified that error appears in the above-identified patent and that said Letters Patent is hereby corrected as shown below:

Columns 14, Line 4 after "of" change "the" to --a--.

Columns 14, Line 14 after "and" change "the" to --a--.

Columns 14, Line 15 delete "driving" before "current".

Column 14, Line 22 after "BEMF" change "of the VCM" to --detector--.

Column 14, Line 41 change "Wherein" to --wherein--.

Signed and Sealed this

Nineteenth Day of December, 2006

JON W. DUDAS  
*Director of the United States Patent and Trademark Office*